United States Patent [19]

Breeden et al.

[11] Patent Number: 4,959,648

[45] Date of Patent: Sep. 25, 1990

[54] DUAL DYNAMIC PRIORITY CONTROL IN A SELCTIVE CALL SYSTEM

[75] Inventors: Robert L. Breeden; Douglas E. Griffin; John H. Kinney, Jr., all of Boynton Beach, Fla.

[73] Assignee: Motorola, Inc., Schaumburg, Ill.

[21] Appl. No.: 308,711

[22] Filed: Feb. 10, 1989

[51] Int. Cl.$^5$ .................. H04B 7/00; H04M 11/00
[52] U.S. Cl. ..................... 340/825.44; 340/825.51; 379/57
[58] Field of Search ............... 379/57, 58, 59, 105; 340/825.44, 825.47, 825.48, 825.51, 311.1; 455/166

[56] References Cited

U.S. PATENT DOCUMENTS 4,438,433  3/1984  Smoot et al. ............... 340/825.44
4,670,872  6/1987  Cordill ....................... 340/825.51
4,825,193  4/1989  Siwiak et al. ................ 340/311.1

*Primary Examiner*—Donald J. Yusko
*Assistant Examiner*—Dervis Magistre
*Attorney, Agent, or Firm*—William E. Koch

[57] ABSTRACT

A selective call control center is provided for transmission of calls to selective call receivers, such as paging receivers. In a first aspect, priorities are assigned to call sources and to call receivers and the order of transmission of calls is determined by the control center as a function of the priorities of the source and the receiver for each call. In a second aspect, at least one call receiver is provided having at least two addresses and the address to be selected from the at least two addresses for calling that receiver is determined dependent on the priority of the source of the call.

11 Claims, 3 Drawing Sheets

DUAL DYNAMIC PRIORITY CONTROL IN A SELCTIVE CALL SYSTEM

BACKGROUND OF THE INVENTION

This invention relates generally to the field of selective call control centers for transmission of calls to selective call receivers, such as paging receivers and more particularly to determining the order of transmission of calls to the receivers and/or determining which address within a receiver is to be called.

As the use of pagers becomes more and more established, the stage is already being reached where the control center of a paging system is becoming saturated at busy times, in the sense that more paging calls are being placed than the system is capable of transmitting to the destination paging receivers on the allocated radio frequency channels. To overcome this problem, control centers of paging systems administer a queue of calls for transmission, by storing each call in memory, and transmitting the calls, often on a first-in, first-out basis.

"Priority" is a concept used in paging control centers, or terminals, to alter the processing of selected calls, primarily in regard to their insertion into an output queue. Specifically, calls assigned a priority higher than that of other calls waiting for output are given advanced placement in the output queue, so that they will be transmitted sooner than calls assigned lower priority.

DESCRIPTION OF THE PRIOR ART

Currently produced paging terminals generally treat priority in one of two manners:

(1) Semipermanent individual assignment of call priority level by means of a parameter in the pager data base (i.e. stored in the paging terminal memory), or (2) The use of a special "priority" input to momentarily raise the priority level of a call placed via that input.

These two manners of treating priority will be explained by reference to the generalized paging system shown in FIG. 1.

In this figure there is shown a paging control center 10, three paging inputs in the form of telephones 11, 12 and 13, and three pagers 14, 15 and 16.

In the first prior art system, each of the pagers 14, 15 and 16 is assigned a priority level, and these levels are stored in a memory in the paging control center 10. Each time a call is placed to the address of a particular pager, the control center 10 is aware of the priority of that address, and determines the order of transmission of calls accordingly.

In the second prior art system, one of the telephones 11, 12 and 13 is designated as a "code blue" telephone, i.e. if a call is placed via that telephone (e.g. telephone 11), such a call is immediately given pre-emptive status, whereby any existing call in progress is interrupted and the code blue call is immediately transmitted. This system is useful where the code blue telephone is assigned for emergency use.

Neither of the above prior art systems is sufficiently flexible to meet present day requirements of paging systems.

SUMMARY OF THE INVENTION

In a first aspect of this invention, the invention provides a method and apparatus for assigning priorities to calls received by a selective call control center. Call sources are provided having different assigned priorities, and call receivers are provided having different assigned priorities. The order of transmission of calls from the call sources to be transmitted to the call receivers is determined as a function of the priorities of both the source and the receiver for each call. It is preferred that the greater of the priorities of the source and receiver determines the order of transmission of a call relative to other calls having higher or lower priorities.

In a second aspect of the invention, a method and apparatus are provided for operation of a selective call system, in which call sources are provided having different assigned priorities and at least one call receiver is provided having at least two addresses. The particular address to be called is determined dependent on the priority of the source of the call. It should be understood, and will be explained hereinafter, that the addresses may take a number of forms. Dependant on which address is called, the call receiver may perform different functions, or operate in different manners.

It is an advantage of the second aspect of the invention that a pager may perform different functions or operate in different manners dependent upon the source of a particular call, but without the need for the operator placing the call to specify the particular function or manner of operation.

BRIEF DESCRIPTION OF THE DRAWINGS

A preferred embodiment of the invention will now be described, by way of example, with reference to the accompanying drawings, in which.

DESCRIPTION OF THE PREFERRED EMBODIMENT

The preferred embodiment of the invention may be described in general terms with reference to FIG. 1, the elements of which have already been described with reference to the prior art.

Figure 2:
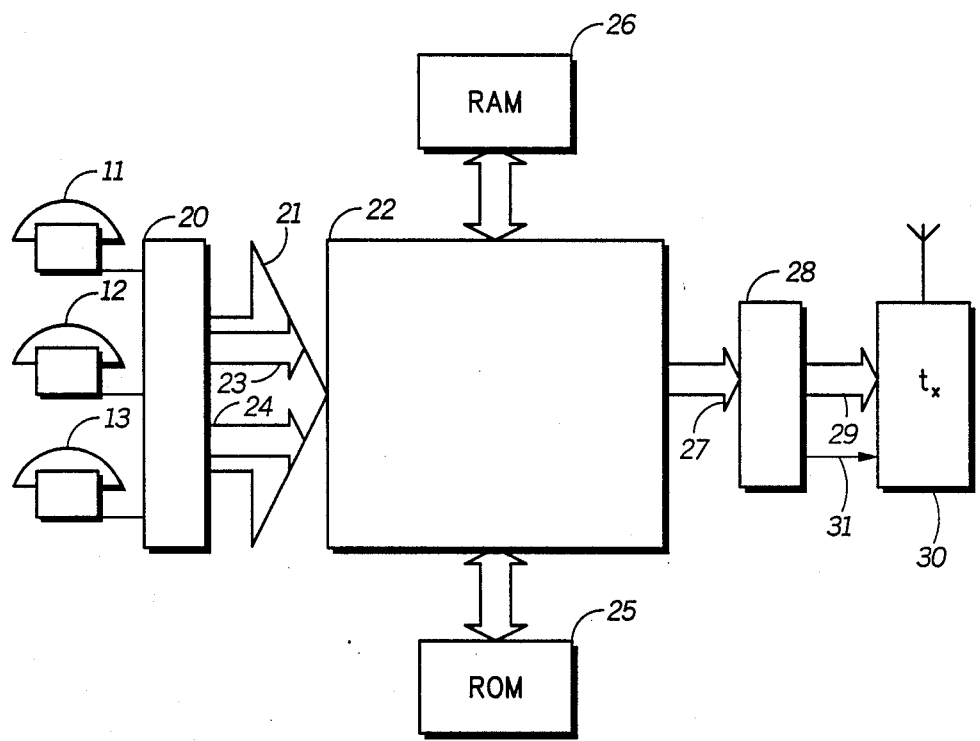
FIG. 2 shows three priority levels, with calls assigned thereto.

When a call is placed, that call is assigned a priority and an identification code identifying the call is placed in a queue corresponding to that priority. This is illustrated in FIG. 2.

Referring to that figure, three queues established by a microprocessor in the control center 10 are shown as blocks 17, 18 and 19. The blocks represent locations in memory (described below) within the control center, in which identification codes of different calls may be stored on a first-in, first-out basis. Sufficient memory is set aside for each block so as to ensure that each block is notationally endless. Identification codes for different calls are represented as $a_1$, $b_1$, $c_1$, etc., queue 17 has top priority (priority $P=1$), queue 18 has second priority ($P=2$) and queue 19 has the lowest priority ($P=3$). In the figure it is shown that there is one call ($a_1$) in queue 17, three calls ($b_1$, $b_2$, $b_3$,) in queue 18, and five calls ($c_1$–$c_5$) in queue 19. In this situation, call $a_1$ has been transmitted, the code $a_1$ will be deleted from queue 17, and call $b_1$ will be the next to be transmitted. Call $b_1$ will be followed by calls $b_2$ and $b_3$, and provided no other calls have arrived in the meantime, call $c_1$ the next to be transmitted after call $b_3$, followed by calls $c_2-c_5$. As soon as a new call comes in, its identification code is assigned to the appropriate queue in accordance with the priority allocated to it. If a priority 2 call arrives its code will be added to the end of queue 18. From queue 18, it will be transmitted in advance of any remaining calls in queue 19. Likewise, if a priority 1 call arrives any priority 2 or 3 call currently being transmitted will be interrupted, queues 18 and 19 will remain unchanged, and the priority 1 call, which is immediately added to queue 17 is immediately transmitted.

Figure 1:
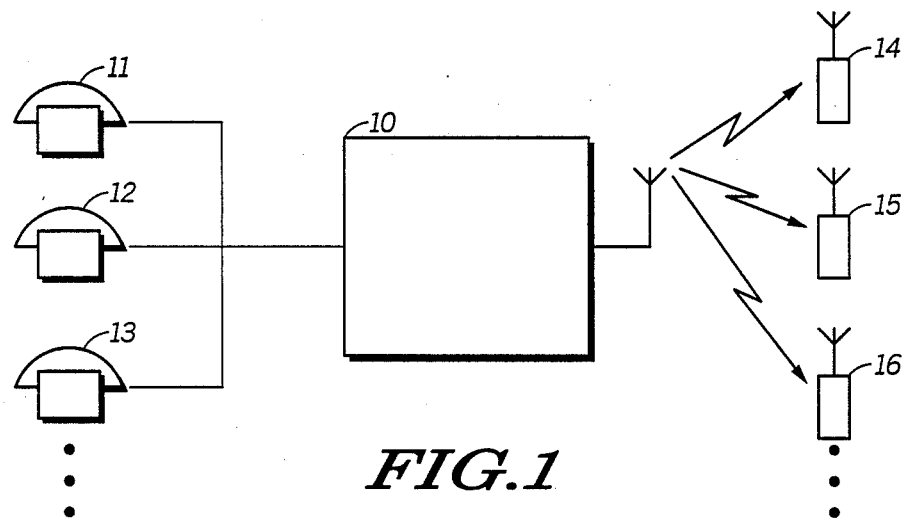
FIG. 1 shows a general paging system.

In the preferred embodiment of the present invention, each of the input devices, shown in FIG. 1 as telephones 11, 12 and 13, is assigned a priority level ($P_s$). There may be a large number of input devices, and there may be a large number of priority levels, but for the purposes of illustration, it will be assumed that there are three priority levels and that telephone 11 is assigned the top priority level, level 1, telephone 12 ( and other telephones not shown) is assigned the next priority level, level 2, and telephone 13 (and other telephones not shown) is assigned the lowest priority level, level 3. As an example, the system may be arranged in a hospital, where telephone 11 is an emergency "code blue" telephone for use only for calling a cardiac arrest team, while telephone 12 (and other telephones of similar priority) is assigned to a doctor or head of nursing staff, and telephone 13 (and other telephones of similar priority) is assigned for general use.

Each of the pagers 14, 15 and 16 (and other pagers not shown) has two addresses. By paging the first address, the addressed pager responds with a loud audible tone, while by paging the second address, the pager responds by a silent vibration. It will be understood that the responses of the separate addresses may take a number of forms, including different volumes of tone, different combinations of tone and/or vibration and/or visible indicators, or different mode of operation, such as variable volume alert and fixed volume alert. There may be more addresses for each pager, typically up to eight.

In addition to the priority levels assigned to the input devices, each of the pagers has an assigned priority level ($P_r$). For the purposes of the present example, it may be assumed that address A of pager 14 has priority 1, and address B has priority 2, and the same for pager 15, while both addresses of pager 16 are priority 2. Other pagers not shown have priority 3. In this example, the operators of pagers 14 and 15 may have special duties as members of a cardiac arrest team, while at the same time they operate as members of the hospital having non-particular duties. Pager 16 is an operator having non-particular duties (not being a member of the cardiac arrest team), and there are other operators of pagers of lower rank. The operators of pagers 14, 15 and 16 may, for example, be doctors and nurses, while the operators of other pagers are orderlies.

The operation of the system is as follows. In the event that there is a cardiac arrest in the hospital, a member of staff places a call through telephone 11, and this has the effect of immediately pre-empting any existing calls being transmitted, and pagers 14 and 15 are paged via their A addresses. In so paging these pagers via their A addresses, those pagers issue an audible tone which the operators of the pagers cannot disable in advance. The system may be configured such that telephone 11 is dedicated only to page those addresses as a group. Thus, telephone 11 may be unable to page pager 16, or other pagers. As an alternative, telephone 11 may be configured to address pager 16 by dialing the appropriate number, and by virtue of the fact that the call has been placed via telephone 11, the call is immediately given pre-emptive status.

In contrast to the above, if a call is placed via telephone 12 to any one of telephones 14, 15 and 16, such a call is a priority 2 call to a priority 2 address (in this case pagers 14 and 15 are addressed via their B addresses) and such a call is placed in a priority 2 queue as described above with reference to FIG. 2. If, by dialing an appropriate number into telephone 12, the system is configured to address pager 14 via its A address, then such a call is treated with pre-emptive status by virtue of the fact that the destination of the call has priority 1.

From the above, it can be seen that priority 1 takes precedence over priority 2, irrespective of whether the priority 1 results from a priority 1 source (telephone 11; $P_s=1$) or a priority 1 destination receiver (address A of pager 14 or 15; $p_r=1$).

To continue the above example, if a call is placed via telephone 13 to pager 16, that call is placed in the priority 2 queue, because the destination of the call (pager 16) has been assigned priority 2. If a call is placed via telephone 13 to another pager (not shown) of priority 3, that call is placed in a priority 3 queue, by virtue of the fact that the source has priority 3 and the destination also has priority 3. None of the calls in the priority 3 queue will be transmitted until all the calls in the priority 2 queue have been transmitted.

The manner in which the above features are implemented is described with reference to FIGS. 3-6.

Figures 3, 4A, 4B:
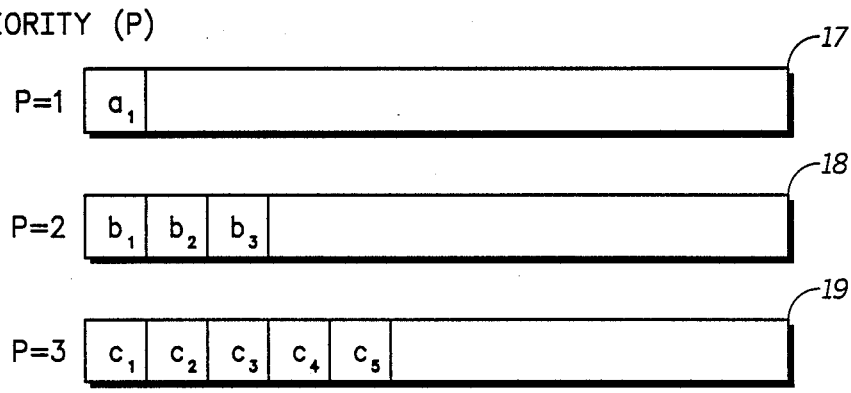
FIG. 3 shows a functional block diagram of a control center in accordance with the present invention.
FIGS. 4A and 4B are look-up tables stored in memory 25 of the control center of FIG. 3.

In FIG. 3, the three input telephones 11, 12 and 13 of FIG. 1 are shown. These telephones are connected to telephone inputs of DTMF decoder and supervisor 20. A data bus 21 connects the decoder and supervisor 20 to a microprocessor 22. Included in the data bus 21 are source identifier lines 23 which identify the input of the decoder and supervisor to which a particular telephone making a call is connected. Also included in the data bus 21 are destination receiver identifier lines 24, which identify the telephone number being dialed. It will be understood that one of the telephones, e.g. telephone 11, can be dedicated to dial a particular number, this number being stored in decoder and supervisor 20 and being sent on data lines 24 automatically upon use of telephone 11. Connected with microprocessor 22 is a read only memory 25, which is preferably an EEPROM. This EEPROM contains a look-up table, which will be described in more detail with reference to FIG. 4. Microprocessor 22 provides an output on data bus 27 to a transmit controller and paging encoder 28, which in turn passes information on data bus 29 to a transmitter 30. The transmitter controller and paging decoder also controls transmitter 30 by an on/off control line 31.

The operation of the apparatus is as follows. A user makes a paging call by picking up one of the telephones, e.g. telephone 12 and dialing a 3-digit number identifying that a call is to be made. The user hears a prerecorded message provided by decoder and supervisor 20, telling the user to dial the number of the pager to which the page is to be transmitted. At this stage a number of further features may be possible, including providing a voice message, keying in an alphanumeric message into a keyboard (not shown) and/or dialing in a call-back number, e.g. through a touch-tone pad, for the person being paged to call back. The decoder and supervisor 20 identifies the telephone input being operated from the hardwired connection to the decoder and supervisor 20, and it passes this information, together with the three digit number paged, on data lines 23 and 24 any other information provided (message, voice etc.) is also passed on data bus 21.

The microprocessor 22 receives this information and performs the following operations. If the call is identified as coming from telephone 11, then the microprocessor performs a look-up operation in the table of FIG. 4A and determines that pagers 14 and 15 are to be paged as a cardiac arrest team on their A addresses. The call is treated as a priority 1 call. If the call originates from any other source, the microprocessor 22 determines that only the pager identified by the user originating the call is to be paged and a look-up operation is made on the look-up table of FIG. 4B. All this information is contained in EEPROM 25.

From the table of FIG. 4B, a number defining pager 15 for example is input and the table identifies that the priority of pager 15 is priority 2. The table also provides the actual address that the transmitter 30 has to transmit to reach that pager on address B. This address is given in the right-hand column. It will be understood that this address could include post-digit addressing, wherein a code is included in the header information at the start of a call/page, that code determining the function that the pager is to perform, e.g. in terms of the type of alarm response.

Figure 5:
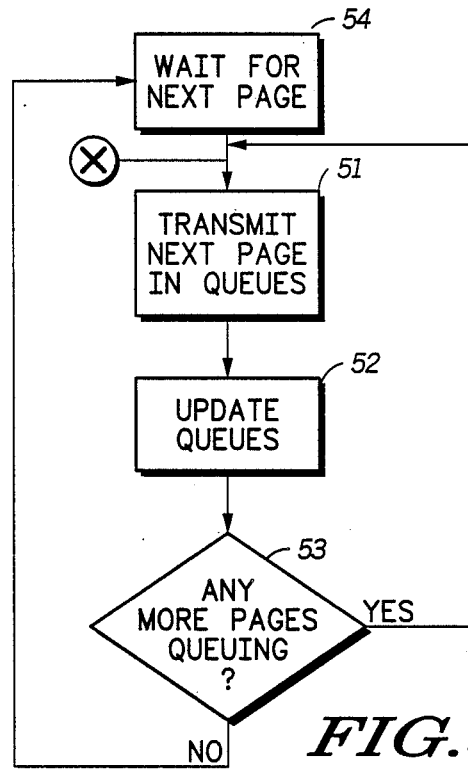
FIG. 5 is a flow diagram of the page transmission operation.

FIG. 5 shows a flow diagram of the overall queue management performed by microprocessor 22. For the purposes of explanation of the diagram, let it be supposed that there are a number of calls waiting for transmission in queues, as shown in FIG. 2. From this situation, the operations of the flow diagram will commence from point X. The uppermost priority call, in this case call $a_1$ is transmitted first, as represented by step 51. Once this page has been transmitted, step 52 is executed in that the queues are updated by deleting code $a_1$ from queue 17. Next, a test is carried out, step 53, and if there are more calls still queuing the program returns to point X, and the next call in the queue is transmitted as represented by step 51. In this case, there are indeed more calls queuing, and the next call to be transmitted is call $b_1$. Thus steps 51, 52 and 53 are repeated until all the queues 17-19 are vacant. At this point, the program passes from step 53 to step 54, and the system waits for the next incoming call from input devices 11-13 etc.

Figure 6:
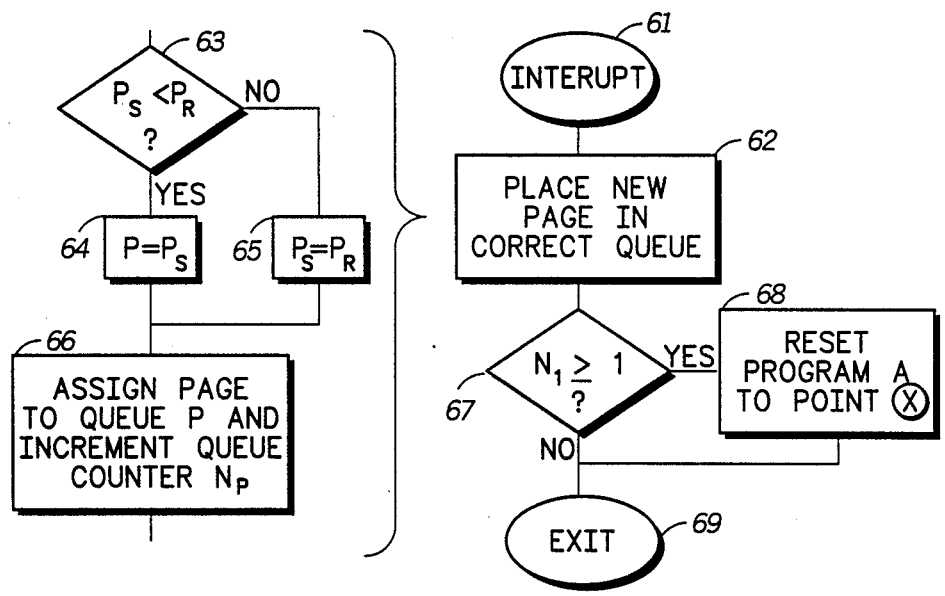
FIG. 6 is a flow diagram of the priority determination operation.

FIG. 6 illustrates the operation of microprocessor 22 on receipt of a new call The program of FIG. 5 is interrupted, as represented by step 61, whenever a new call is received from one of the input devices and the identification code of the new call is placed in the correct queue, as represented by step 62. On the left hand side of the figure, it is shown that step 62 comprises a number of smaller steps, in which the priority of the call source ($P_s$) associated with the source 11, 12, or 13 is compared with the priority of the call destination receiver ($P_r$) i.e. the priority of pager 14, 15, 16. If the priority ($P_s$) of the source is greater (numerically lower), then the priority P assigned to that call is made equal to $P_s$ (step 64). On the other hand, if the priority of the call receiver ($P_r$) is greater than that of call source ($P_s$) then the priority of the call (P) is made equal to $P_r$ (step 65). Based on the priority P of the call, that call is assigned to the appropriate queue and a queue counter $N_p$ of that queue is incremented (step 66).

Referring again to the right hand side of the diagram, the next step to be implemented is step 67 in which the queue counter of the priority 1 queue i.e. $N_1$, is tested. If $N_1$ is greater than or equal to 1, then the program of FIG. 5 is reset to point X. The reason for this test is to ascertain whether a pre-emptive priority call is to be made (a code blue call), and if so, to interrupt the transmission of the current call, and immediately transmit the priority 1 call by resetting the program to step 51, at which point the program recognizes the priority 1 call as being the next call in the queues. Upon completion of step 67 or 68, as the case may be, the program of FIG. 6 is exited at step 69, and the program of FIG. 5 resumes normal operation, with the new call having been assigned to its appropriate queue. From FIG. 6, it can be seen that the priority of a call is made equal to the greater of the priority of the source and the priority of the call receiver or destination.

The above description of the preferred embodiment has been given by way of example, and it will be understood that modifications can be made within the scope of the invention. Thus, for example, the comparison of $P_s$ and $P_r$ may take various other forms. These priorities may, for example, be numerically added, and the resulting sum be taken as the overall priority P. In the above case, the highest overall priority would be P=2. In such a case, P=2, and P=3 could be made pre-emptive priorities, since these values can only be reached if $P_s$ or $P_r$=1. Many other functions can be envisaged in which P depends on both $P_s$ and $P_r$. Further look-up functions would be another example.

What is claimed is:
1. A selective call controller comprising:
   means for receiving calls from call sources, for identifying the source of each call, each of said call sources having a predetermined priority;
   means for transmitting said calls to call receivers, each of said call receivers having a predetermined priority; and
   means for determining an order of transmission of the calls to the receivers as a function of the priorities of the source and the receiver for each call.
2. The controller of claim 1, further comprising means for comparing the priority of the source of each call with the priority of the receiver for that call and means, responsive to the means for comparing, for assigning an overall priority to that call, said overall priority corresponding to the greater of said priorities, wherein the overall priority of a call determines the order of transmission of the call relative to other calls having higher or lower overall priorities.
3. A selective call system comprising:
   a plurality of call sources having different assigned priorities;
   a plurality of call receivers having different assigned priorities;
   a selective call control center including means for assigning priorities to calls received by the control center from the call sources for transmission to the call receivers;
   transmission means for transmitting the calls to the call receivers; and
   means for determining an order of transmission of the calls to the receivers as a function of the priorities of the source and the receiver for each call.

4. A selective call system comprising:

at least call receiver having at least two addresses;

a selective call controller having means for receiving calls from call sources, for identifying the source of each call, and for assigning a priority to said source and having means for determining which of said at least two addresses is to be called dependent upon the priority of the source of the call whereby the priority of a source is used to determine both the order of transmission of calls and the address in the receiver which is called.

5. A method of assigning priorities to calls received by a selective call control center, comprising the steps of:

providing call sources having different assigned priorities;

providing call receivers having different assigned priorities;

receiving a plurality of calls from the call sources for transmission to the call receivers; and determining an order of transmission of the calls to the receivers as a function of the priorities of the source and the receiver for each call.

6. The method of claim 5, wherein the priority of the source of each call is compared with the priority of the receiver for that call and an overall priority is assigned to that call, said overall priority corresponding to the greater of said priorities, wherein the overall priority of a call determines the order of transmission or the call relative to other calls having higher or lower overall priorities.

7. The method of claim 6, wherein calls of equal overall priority are formed into a queue on a first-in first-out basis.

8. The method of claim 7, wherein all calls in a queue of higher overall priority are transmitted before the first call in a queue of lower overall priority is transmitted.

9. The method of claim 8 further comprising the steps of interrupting a call of lower overall priority, transmitting a call of highest overall priority and re-transmitting the interrupted call when there are no more calls of the highest overall priority.

10. The method of claim 5 wherein an overall priority is assigned to each call; wherein the overall priority of a call determines the order of transmission of the call relative to other calls having higher or lower overall priorities; wherein a predetermined number of overall priorities are assignable to calls; and wherein a call having the highest overall priority is transmitted on a pre-emptive basis such that calls of lower overall priorities are interrupted to transmit the call having the highest overall priority.

11. A method of operating a selective call system, comprising the steps of:

providing call sources having different assigned priorities;

providing at least one call receiver having at least two addresses;

determining which of said at least two addresses is to be called dependent upon the priority of the source of the call wherein the priority of a source is used to determine both the order of transmission of calls and the address in the receiver which is called.

* * * * *